Figure 1:
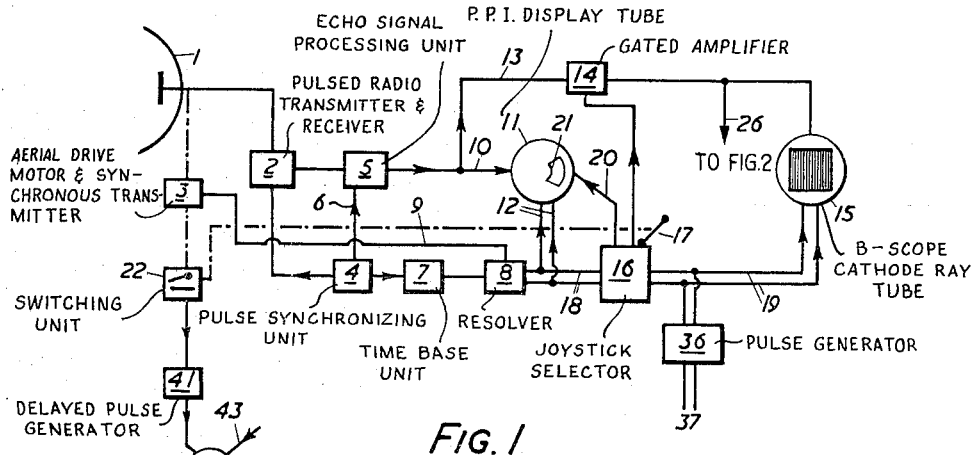

Aug. 17, 1965   E. EASTWOOD   3,201,790
RADAR SYSTEMS

Filed April 25, 1961   3 Sheets-Sheet 1

INVENTOR
Eric Eastwood
BY Baldwin & Wight
ATTORNEYS

Aug. 17, 1965   E. EASTWOOD   3,201,790
RADAR SYSTEMS
Filed April 25, 1961   3 Sheets-Sheet 2

INVENTOR
Eric Eastwood
BY
Baldwin & Wight
ATTORNEYS

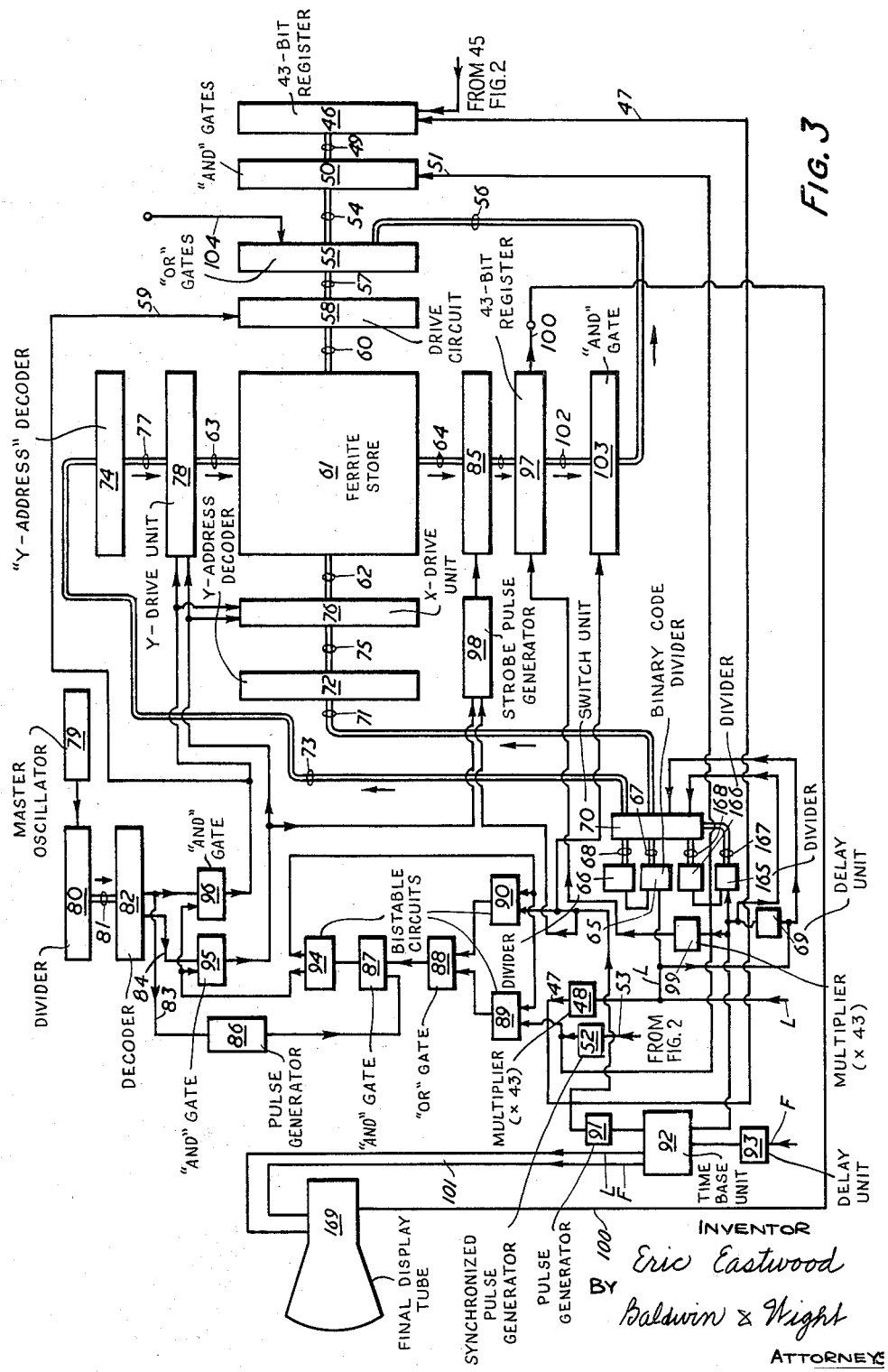

3,201,790
RADAR SYSTEMS
Eric Eastwood, Little Baddow, England, assignor to The Marconi Company Limited, London, England, a company of Great Britain
Filed Apr. 25, 1961, Ser. No. 105,511
Claims priority, application Great Britain, May 3, 1960, 15,539/60
11 Claims. (Cl. 343—11)

This invention relates to radar systems and has for its object to provide improved radar systems which shall be such that aircraft missiles and like man-made targets which it is the normal purpose of a radar system to detect, can be reliably detected despite the presence of clutter.

Clutter is a persistent and long-experienced source of trouble in radar surveillance, defense and like systems. The word is here used in a wide sense to mean the display of undesired targets due to reflected echoes from objects which it is not desired to observe. The effect of clutter is, as is well known, to prevent or hinder the detection of targets which it is desired to observe by obscuring areas of a radar display tube screen with numerous undesired target displays among which the desired targets are "lost," i.e. difficult or impossible to detect. Clutter can be caused in various ways, notably by back-scatter of the transmitted radio energy from the ground "ground clutter" or from meteorological phenomena, such as clouds, rain, or snow "rain clutter." It may also take the form widely known as "angels." This form of clutter is particularly difficult to deal with. Its cause is still uncertain though there is good reason to believe that at any rate a proportion of "angels" are caused by the movements of birds. All the forms of clutter are capable of very adversely affecting the utility of a radar system, especially a high power surveillance radar system keeping watch over a large area by displaying it in the usual P.P.I. display on a cathode ray tube screen. It will be appreciated that the finite scanning spot on the screen of the display tube of such a radar system, though small, necessarily corresponds to an appreciable part of the coverage of the system and it does not take much clutter to introduce a real risk that important targets may pass undetected through the coverage of the system. Indeed it is a common experience with such systems that bad clutter may, from time to time, so obscure some areas of the screen as to make the detection of desired targets in those areas extremely unreliable or even impossible.

Various attempts have been made over a long period of time to circumvent the serious operating difficulties introduced by clutter. They may be summarised in the statement that they all attempt to meet the difficulty by reducing or eliminating clutter. As will be seen later, the present invention approaches the problem in a totally different way, namely, not by reducing clutter (though, in carrying out the invention, any of the known expedients for reducing clutter may, with advantage, be employed) but by providing a display of such a nature that desired targets can still be detected despite the presence of clutter. One of the known expedients which has been adopted in order to eliminate clutter, is the use of so-called M.T.I. (moving target indicator) radar systems in which the display of echoes from fixed, and to some extent, slowly moving targets—such as the echoes from ground features or slowly moving clouds or rainstorms—is prevented by taking advantage of the fact that such echoes are of a frequency which is the same as, or close to, the transmitted frequency, whereas the echo frequencies from fast moving targets such as aircraft or missiles differ substantially from the transmitted frequency because of Doppler effect. It has also been proposed to reduce rain and similar clutter in pulsed radar systems by differentiating against echo pulses which are materially longer than the transmitted pulses, it having been found that pulses reflected from clouds, rain or the like are usually considerably longer than the transmitted pulses. Nevertheless, despite the adoption of these and other known expedients, clutter still remains a potent source of trouble, especially, though by no means exclusively, clutter of "angels" form.

According to this invention in its broadest aspect a radar system comprises means for repeatedly exploring a volume of space with transmitted radio energy, successive explorations occurring at a normal predetermined repetition rate, means for producing, from each exploration, a set of radio echo signals representative of radio reflecting targets in said volume and encountered during that exploration, and means for displaying the sets of produced echo signals at a repetition rate, from set to set, which is high in relation to the repetition rate of exploration.

The basic principle of the invention, discovered by extensive experiment, lies in the fact that, if a number of successive explorations of a volume of space containing both clutter and desired targets is made, and the sets of signals (one set from each exploration) are then displayed one after another at a repetition rate which is much higher than the repetition rate of exploration, desired targets such as aircraft or missiles can be reliably detected in the resultant display (despite the presence of clutter) because such desired targets have what may be termed a "pattern of movement" which is quite different from the pattern of movement (if any) of elements of displayed clutter. The effect of speeding up the repetition rate of the displayed sets of signals, from set to set, is to accentuate the difference of pattern of movement and render it detectable by the eye which can accordingly easily pick out a desired target, by the nature of its movement, from the surrounding clutter notwithstanding that, were the sets of signals to be consecutively displayed as in the ordinary way, at the same repetition rate as that of exploration, it might be quite impossible to determine by eye which "spots" in the display were spots of clutter and which were aircraft. The beneficial effect is very real and can be tested and experienced by taking photographs of an ordinary cluttered radar display with each successive exploration on a successive frame of a cinematograph film and then projecting the film at a speed sufficient to give persistence of vision, or approaching it. Though if any of the single frames is projected as a "still" it may be quite impossible to detect an aircraft in the clutter, as soon as the film is projected at a fair speed, so that each frame follows the preceding one rapidly enough for the eye to "remember" the preceding picture, aircraft become easily detectable and, if the film be stopped at a frame, a previously detected aircraft can be picked out without difficulty.

Preferably the aforesaid volume of space is a small part of the whole coverage volume of space of the radar system and means, of any form known per se, are provided for moving the aforesaid volume to different positions in said coverage volume.

According to a feature of this invention a radar system comprises means for repeatedly exploring a volume of space with transmitted radio energy, successive explorations occurring at a normal pre-determined repetition rate; means for producing from each exploration a set of radio echo signals representative of radio reflecting targets in said volume and encounted during that exploration; a signal store; means for storing in said store a plurality of said sets of radio echo signals produced from a succession of explorations, said sets being stored in said store at the intervals at which they are produced and said store being adapted and arranged, when once filled, to accept further successive sets in successive replacement of the sets already in said store when filled whereby said store remains filled with the last produced plurality of sets; means for cyclically and continuously taking off from said store the signals stored therein at a rate such that the number of sets of signals taken off per unit of time is high in relation to the number of sets of signals placed in said store per unit of time; and means for displaying the signals taken off.

The means for taking off signals from the store may be adapted to take them off in the same order as that in which they were stored in said store, or in the opposite order, or means adapted to operate in either order may be provided.

In one way of carrying out the invention there is provided a store comprising in combination a cathode ray storage tube of the kind having a storage target, and a matrix of storage elements; means for storing in said target successive sets of radio echo signals; means for picking off from said target each set of radio echo signals in the interval between the storing of one set and the storing of the next; means for feeding the picked off signals to said matrix and means for directing each successive picked off signal to a different address in said matrix; means for cyclically and continuously taking off from said matrix the signals stored therein, and a display cathode ray tube fed with the signals taken off from said matrix.

Preferably the signals of each set stored in the storage tube target are distributed thereover in accordance with a television line raster and the taken-off signals fed to the display tube are displayed thereby in a corresponding television line raster.

The radio echo signals representative of radio reflecting targets may, if desired, all be included in the sets of radio echo signals which are produced, but preferably those of said echo signals which do not differ substantially in frequency from the transmitted frequency and/or those of said echo signals which exceed a predetermined time duration may be eliminated by means known per se from said produced sets. In other words the known expedient of reducing clutter by M.T.I. reception, or, in the case of pulsed radar systems, the known expedient of reducing clutter by pulse length discrimination, may be employed in carrying out out this invention.

A complete radar system in accordance with this invention preferably includes, in addition to the display means already mentioned, and ordinary P.P.I. display tube displaying the whole coverage volume of the system and an additional display tube arranged to provide, in the ordinary manner, a television line raster display of the sets of signals as they occur.

There will now be described, with reference to the accompanying drawings, an at present preferred embodiment utilising, as a store, the combination of a single storage cathode ray tube and a matrix of storage elements. It is to be understood, however, that other forms of store, known per se, may be used instead, e.g., one using two matrices in co-operative cascade instead of a storage tube and one matrix; or one using a number of storage tubes each taking a different successive set of echo signals, in combination with a matrix.

Figure 4:
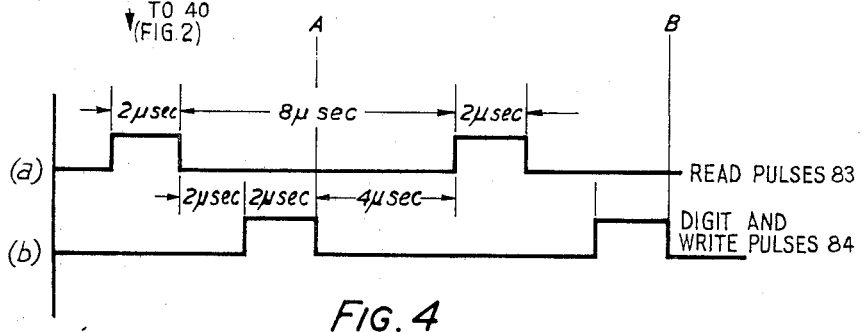
Figure 5:
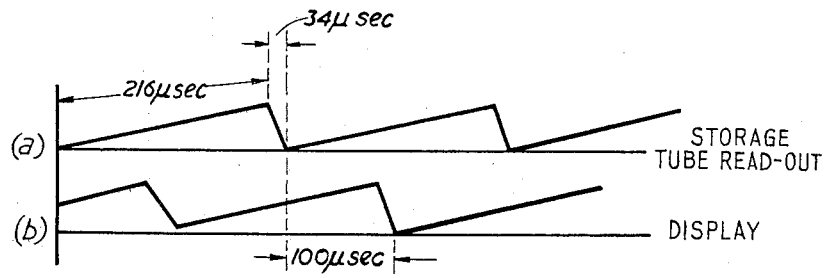
Figure 2:
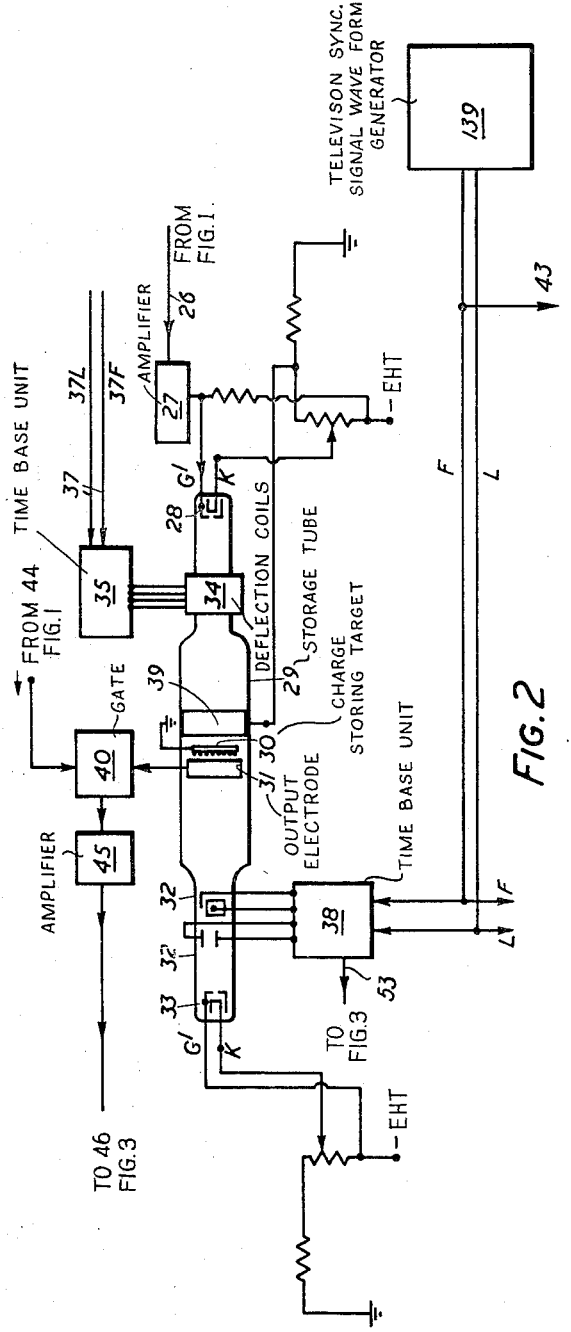

In the drawings, FIGS. 1, 2 and 3 illustrate diagrammatically and between them one embodiment. Parts of these figures are connected to one another to make the complete embodiment and, of course, such parts are indicated by the same references. FIGS. 4 and 5 are explanatory graphical figures. In describing the drawings certain practical time values will be given, but these are by way of example only.

Referring to FIGS. 1 to 3, the embodiment therein shown includes a scanning aerial 1 which is rotated in azimuth in the customary way and with which is associated a pulsed radio transmitter and a radio receiver, both represented as within the block 2. The aerial is continuously rotated at, for example 4 r.p.m. by a driving motor which is within the block 3 which is also assumed to contain any suitable device, such as a Selsyn transmitter, which will provide signals representative of the successive positions of the aerial during rotation.

The transmitter in block 2 is pulsed at a desired pulse repetition frequency of, for example, 250 pulses per second, in any convenient well known way by a pulse synchronising unit 4. Signals from the receiver in block 2 are fed to an echo signal processing unit 5 which may be of any kind known per se. The unit 5 may be a simple frequency changing and amplifying unit adapted to produce echo signals corresponding to all radio reflecting targets picked up by the radar system or it may include so-called M.T.I. and/or pulse length discriminating circuits adapted to discriminate against echo signals from stationary or very slow moving targets and/or against echo signals of more than a predetermined reflected pulse length. Since circuits adapted to produce these forms of discrimination are known and constitute in themselves no part of this invention they need not be described here. In FIGURE 1 the unit 5 is presumed to include M.T.I. circuits and accordingly a connection 6 is shown between units 4 and 5 to indicate that synchronising signals are also fed to the unit 5 for use, in known manner, in the M.T.I. circuits therein.

Synchronising signals are also fed to a time base unit 7 the output of which is passed to a resolver in unit 8 to which is also fed over lead 9 signals representative of the rotary movement of the aerial 1. The output video signals from unit 5 are fed over lead 10 to an ordinary P.P.I. display tube represented by the circle 11 which is subjected to deflection controlled by output from unit 8 and fed to the deflection system of the tube (not separately shown) over leads 12 so that said tube produces a P.P.I. display all as well known per se.

Video signals from unit 5 are also fed over lead 13 to a gated amplifier 14 whose gated output is fed to a so-called B-scope display cathode ray tube represented by the circle 15 and adapted to produce a substantially rectangular display of the television raster type as conventionally indicated by the lined rectangle shown in the circle. The amplifier 14 is gated by signals from a so-called joystick selector 16 having a joystick control handle 17. The unit 16 receives signals over lead 18 from unit 8 and controls the deflection signals fed over leads 19 to the deflection system (not separately shown) of the B-scope display tube 15. The selector 16 is constructed and arranged in manner well known per se to enable any relatively small area of the total coverage (displayed by the tube 11) of the radar system to be selected and displayed, to a larger scale than the display of the tube 11, by the tube 15. By moving the joystick handle 17, the selected area for display by the tube 15 can be moved anywhere within the total coverage area and the position of the area selected is displayed on the tube 11 by feeding thereto signals controlled by the joystick selector. This is indicated purely schematically in FIGURE 1 by showing a lead 20 between the selector 16 and the tube 11 and by showing at 21 a small area, bounded by two concentric arcs and by parts of two radii. For purposes of the present description, it will be assumed that the angle between the boundary radii of the area selected is 20° and that the radial dimension of said area corresponds, on the P.P.I. tube 11, to 20 statute miles.

As so far described the radar system is as well known and requires no further description here. Assuming the figures given above, the arrangement is such that, on each transit of the aerial 1 through the selected area, there will be formed on the B-scope tube 15, a picture consisting of about 200 traces each of a duration of 216 μsecs., and occurring at intervals of 4 millisecs.

Driven with the aerial 1 is a switch or other unit 22 adapted to produce a control pulse each time the aerial 1 is about to start moving across the arc of the selected area 21. The unit 22 might, in its simplest form, include a switch driven with the aerial 1 so as to close momentarily once per revolution of the aerial and at a point in the revolution controlled by the handle 17. This is indicated schematically by chain lines (representing mechanical connections) in FIGURE 1. In practice, of course, an equivalently controlled electronic pulse source would be used in place of a mechanical switch.

Signals from the gated amplifier 14 are fed over lead 26 via an amplifier 27 to the writing gun of a known storage tube 29 which also has a charge storing target 30, a cylindrical output electrode 31, mutually perpendicular pairs of deflector plates 32, a reading gun 33 and the customary collimator electrode 39. The writing gun is subjected to B-scan raster deflection by a deflection coil system 34 which receives line and field deflection saw tooth currents from a time base unit 35.

The line and field deflection signals on leads 19 (the field and line signal leads are distinguished by the letters F and L respectively) are fed to a pulse generator unit 36 which is controlled thereby in well known manner to produce field synchronising pulses at the commencement of each field and line synchronising pulse at the commencement of each line. These pulses are applied over leads 37 to the appropriate parts of the time base unit 35 to produce the required deflection of the ray from the writing gun.

Accordingly, while the aerial 1 is passing through the arc of the area 21 the echo signals are "written," B-scan fashion, in the form of charges on the target 30. These charges are read off by the reading gun 33 which is deflected in a television raster by a line and field time base unit 38 controlled by signals from a television synchronising signal wave form generator 139. The target structure of the tube is constructed, in known manner, to have a charge leakage time such that charges "written" on it will fade away in a time less than that taken by one revolution of the aerial, e.g. it may be advantageously arranged so that the charges will fade during the period taken by the aerial to rotate through 330° in the case where the arc of the selected area 21 is 20°.

During each field scanned by the reading gun on the target 30 output signals are produced on the output electrode 31 but it is not required to utilise output signals corresponding to repeated reading gun field scans of the same stored signals. Accordingly the output electrode 31 is fed to a gate 40 which is opened only for one field period of the reading gun after a field of signals has been stored. The opening of the gate 40 at the required time and for the required period is effected by means including a delayed pulse generator 41 which is triggered by each pulse produced by the switch unit 22 and is adapted in response to each triggering pulse to produce an output pulse of length a little less than the duration of two field periods and commencing at some predetermined time delay, e.g. 10 seconds, after the aerial 1 has passed through the arc of the area 21 and is pointing in some chosen direction outside that area. This time delay may be arranged to be adjustable. The delayed pulse from unit 41 is fed to any known form of "and" gate 42 to which is also fed field synchronising pulses over lead 43. The "and" gate is such that it will pass pulses from lead 43 only when they occur during a pulse from unit 41. Accordingly, during each pulse from unit 41 there will be two, and only two, successive output pulses from unit 42. These pulses are fed to a gate control unit 44 arranged in known manner so that the first of them opens the gate 40 and the second of them closes the gate again. The gated output is amplified by amplifier 45 and it will be seen that the output signals during each opening of the gate 40 will correspond to the signals read off during one field scan of the reading gun.

The output signals from the amplifier 45 will consist of fields each of 200 lines (with the example row being described) the fields being spaced in time by the period of one revolution of the aerial. Suppose, to take practical figures, each line occupies 216 μsec. and is followed by a fly-back interval of 34 μsec. making 250 μsecs. per line (including fly-back) and 50 millisecs. per field. The information in these signals is quantised into 5 μsec. intervals, the said signals being fed into a 43-bit register 46 of any known form, e.g. one comprising 43-bistable transistor stages. The 5 μsec. timing pulses for this register are fed to it over lead 47 from a multiplier 48 having a multiplication factor of 43 and fed with line signals from the line signal lead L. The 43 outputs (shown as grouped in a cable 49) from the register 46 are fed each to a different one of 43 "and" gates within block 50, the second inputs to these gates being fed in over lead 51 from a pulse generator unit 52 synchronised over lead 53 by the line time base in the unit 38 and adapted to produce a gate opening pulse of the same length and occurring simultaneously with the line flyback.

The 43 outputs from the gates 50 are fed in through leads represented by cable 54 to 43 "or" gates 55 whose second inputs, obtained in manner to be described later, are fed in to them over 43 leads grouped in the cable 56. The outputs from the gates at 55 are fed over cabled leads at 57 to 43 drive circuits in block 58. Each drive circuit receives as its second input a digit instruction pulse fed in over lead 59. It will be appreciated that the output on any lead in cable 57 may be a "1" or a "0" and the drive circuits are so arranged that each of the 43 of them will give a drive output if the appropriate input to it from 55 is a "0" input and occurs simultaneously with an instruction pulse on lead 59. The derivation of the digit instruction pulses will be described later.

The 43 outputs from the unit 58 are fed over cabled leads 60 to a ferrite store 61. This store consists of 176,128 square hysteresis loop "memory" ring ferrite cores each with four windings, namely an X winding, a Y winding, a digit winding and a sense winding. These cores are arranged in 43 levels each consisting of 64×64 cores arranged in rows and columns, there being 64 cores in each row and 64 in each column. There are 64 X inputs fed in over cable 62 each wire of which feeds in series all the X windings of the cores in corresponding rows in all the levels: thus, for example, one X wire would lead in series through the X windings of the cores in the first row of the first level, then in the opposite direction through the X windings of the cores in the first row of the second level . . . and so on to the X windings of the cores of the first row of the 43rd level. There are similarly 64 Y inputs which are fed in over 64 cabled wires 63 each of which feeds in series all the Y windings of the cores in corresponding columns in all the levels. There are 43 "digit" inputs fed in over 43 cabled wires 60 from the unit 58, each wire 60 feeding in series all the digit windings of the cores in one level, passing through the digit windings of the cores in one row, then in the opposite direction through the digit windings of the cores in the next row . . . and so on. Thus the run of digit wire through any row will be alongside the X run of wire in that row and it is arranged that these two runs, which are alongside one another, are electrically in opposite directions.

There are 43 "sense" outputs fed out over 43 cabled leads 64. Each of these output wires passes in series through all the sense windings of the cores in one level. Each wire 64 passes the sense winding in the appropriate level in crossed angled fashion passing first through the windings in one diagonal, then back through the windings in a line parallel to that diagonal but spaced therefrom by an intermediate line parallel to that diagonal . . . and so on until the winding of the corner core on one side of the diagonal is reached: then through the windings of the cores of the second diagonal and back through the windings in a line parallel to said second diagonal but spaced therefrom by an intermediate line parallel to said second diagonal until the winding at a second corner core is reached . . . and so on until all the sense windings in the level concerned are included in the series circuit.

The ferrite store 61 is not shown in detail because it is known per se and is of the general nature of that described by Quartly, Cain and Clarke in a paper entitled "A Matrix Store for Data Rate Conversion" in the "Convention on Ferrites" of the Institution of Electrical Engineers October 29–November 2, 1956. Reference may be made to this paper for further information.

Line synchronising pulses from lead L are fed to a six-stage binary code divider 65 having six outputs (one from each stage) which are grouped in cable 67. There is a similar 64-factor divider 66 whose six outputs are grouped in cable 68. Divider 66 is driven by divider 65 as indicated, receiving one pulse therefrom in response to the 65th, 129th . . . and so on pulse fed in to divider 65. There are two more, similar dividers 165 and 166 each with six cabled outputs 167, 168 arranged in the same way as dividers 65 and 66, but with the divider 165 fed through a delay unit 69 from the lead L. Each pair of dividers 65 and 66 or 165 and 166, comprising as each pair does, 12 stages, is capable of counting up to $2^{12}=4096$. In this equipment counting by each pair up to 4000 is all that is required. Accordingly, each pair is arranged, as well known per se, to reset to 1 after counting to 4000. The delay of the unit 69 may be of any arbitary amount, say 100 $\mu$secs., so long as it is less than a line period. 70 is an electronic switch unit comprising twelve two-way switches. Each of these switches will take one or other of two inputs, one from one of the 12 leads grouped in cables 67 and 68 and the other from one of the 12 leads grouped in cables 167 and 168. The switches are controlled by pulses from lead L in conjunction with delayed pulses from delay unit 69. The control is such that, when a pulse from lead L is present, the switches are moved to the positions in which they take inputs from one or other of the wires in cables 67 and 68 while, when a delayed pulse from 69 is present, they take inputs from one or other of the wires in cables 167 and 168. The outputs of six of the switches at 70 feed over the six-wire cable 71 to an X-address decoder 72 and the other six switches feed over cable 73 to a "Y-address" decoder 74. The X decoder 72 has a 64-wire cabled output 75 feeding into an X-drive unit 76 with 128 drive circuits and similarly the 64-wire cabled output 77 from the Y decoder feeds a Y-drive unit 78 also with 128 drive circuits.

The decoders 72 and 74 serve to decode the states of the dividers or counters 65, 66, 165, 166 to which they are at any given moment connected. At any given moment one of the output wires 75 and one of the output wires 77 will carry a 1 signal and all the other wires at 75 and 77 will carry 0 signals, the 1 signal wires being determined at any time by the state of the dividers. Each of the output wires at 75 or 77 controls two of the drive circuits in units 76 and 78 respectively. Thus a 1 signal on any output wire 75 or 77 selects two of the drive circuits in 76 or 78 respectively. "Read" and "write" instruction pulses are fed in to the drive circuit units 76 and 78 in manner now to be described.

79 is a master oscillator crytal or otherwise controlled to have a periodicity of, say, 1 $\mu$sec. Its output is divided in frequency by a divider 80 having a periodicity of 10 $\mu$sec. and incorporating 20 stages with 20 outputs shown as grouped in the cable 81. These outputs go to a decoder 82, similar to the decoders 72 and 74 but having two outputs 83 and 84. These outputs are as represented graphically at (a) and (b) respectively of FIGURE 4. The output 83 operates a pulse generator 86 which produces pulses each coincident with the trailing edge of one of the 2 $\mu$sec. pulses in waveform (b) of FIGURE 4. The produced pulses are passed to an "and" gate 87 whose second input comes from an "or" gate 88 receiving its two inputs from bi-stable circuits 89 and 90. The former receives one input from unit 52 the input to which (on wire 53) is shown at (a) of FIGURE 5 and the output from which is a pulse occurring simultaneously with and having the same duration as the fly-back period of waveform (a) of FIGURE 5. The unit 89 is so arranged that the leading edge of the pulse from 52 triggers it. It will be appreciated that waveform (a) of FIGURE 5 is the line deflection waveform for the reading gun of tube 29. One input to the second bi-stable circuit 90 comes from a pulse generator 91 which is triggered by the line output from a field and line time base unit 92, which is to be employed for the final display tube to be referred to later. This unit 92 receives synchronising line signals from delay unit 69 and field synchronising signals through an identical delay unit 93 fed from lead F. Generator 91 is arranged to produce a pulse synchronous with and of the same duration as the fly-back period in the delayed line time base waveform which is as shown at (b) in FIGURE 5. As before the bi-stable circuit 90 is arranged to be triggered by the leading edges of the pulses from 91.

Output from the "and" gate 87 is fed to a further bi-stable circuit 94. Thus the first pulse to arrive at 87 from 86 after either 89 or 90 has given an output will trigger unit 94 and the next pulse from 86 will reset 94. When unit 94 resets it provides a resetting pulse which is fed back to and resets units 89 and 90. When unit 94 triggers it supplies a pulse to "and" gates 95 and 96 which are "read" and "write" gates respectively. Simultaneous inputs to unit 95 from output 84 and unit 94 cause a pulse, which is the "read" instruction pulse, to be sent to the drive circuits—which are the "read" drive circuits—included in units 76 and 78. Similarly simultaneous inputs to 96 from output 83 and unit 94 cause a pulse to be sent to the "write" drive circuits included in units 76 and 78, each of these units having 64 read drive circuits and 64 write drive circuits, and to digit drive circuits 58 over lead 59.

The store 61 is such that the operation of reading out any information from an address therein destroys the information stored there. It will now be understood that once during each revolution of the aerial 1—i.e. when it is passing through the area 21—one field of information in the form of 200 lines is stored in the tube 29 and at a later time in the revolution this information is stored in the store 61 in a period of 10 $\mu$secs., each line of it going to a different consecutive address in the store. Any writing in of new information is preceded by reading off previously stored information to destroy it and, were means not provided to prevent it, this destruction would provide from the store output signals which it is not desired to display on the final display tube which is, of course, required to display only the latest information stored. The output signals from the store go over the 43 output wires of cable 64 via gates in block 85 to a 43-bit register 97 which is the counterpart of unit 46. In order to prevent display of the signals from the store 61 produced by destruction of previously stored information during the writing in of new information, the gates at 85 are opened only during short periods each in a fly-back period of the display tube time base (waveform (b) of FIGURE 5) each such period occurring during the occurrence of a "read instruction" pulse from unit 95.

This is done by a strobe pulse generator 98 controlled by two inputs, one taken from the unit 95 and the other from unit 91. The unit 98 is in effect an "and" gate producing a pulse to open the gates 85 only during the common existence of pulses from 95 and 91. At all other times signals produced in the wires of cable 64 are blocked by the gates 85.

The 43 gated outputs from gates 85 set up the corresponding 43 bi-stable elements in the register 97. To this register are fed timing pulses taken from a multiplier 99 having a multiplication factor of 43 and fed with output from unit 69. These pulses read out the register serially to produce signals on lead 100 which leads to the control electrode of the gun of the final display tube 169. This tube has a television raster deflection with field and line deflecting elements (not shown) fed over leads 101L and 101F from the unit 92.

In addition the register 97 is used to put back into the store 61 the information which has been read out from the store into the register in order to set up said register which information has, of course, been erased from the store by the act of reading it out. For this purpose the 43 elements in the register 97 are connected over 43 wires grouped in cable 102 to 43 "and" gates in the unit 103. The second signal to these "and" gates is taken from unit 91 and the 43 outputs are taken over cable 56 to unit 55.

When the area 21 is to be moved it will normally be required to erase all information in the store 61. This may be done by applying over lead 104 to the gates in unit 55 a signal of appropriate nature to produce 0 outputs from the unit 58. This signal should have a duration of at least one second—the duration of 20 fields, which the store 61 holds—and may in practice be obtained automatically by a relay (not shown) actuated in any convenient manner when the handle 17 is moved.

The general operation of the whole installation is as follows: A normal P.P.I. picture with its selected area 21 is displayed on the tube 11 and a television B-scope picture of this area 21 and consisting of 200 lines is displayed on the tube 15 and simultaneously stored on the target of tube 29. At a later time (say 10 secs. later) before the next picture is put on tube 15 the information in the last picture stored on said target is read off and supplied line by line to the store 61 which holds the information corresponding to 20 such successive pictures. The information contained in the next picture (the 21st) put into the store erases and replaces that of the first one put in, the 22nd replaces the 2nd and so on so that there are always the last 20 pictures in the store. The successive pictures put into the store are put in one per revolution of the aerial, i.e. one every 15 seconds. They are read out of the store at 20 pictures per second and are displayed by the final display tube 169 at this picture repetition rate. Picture information destroyed by reading out from the store for display on the final display tube are put back into the store into the addresses from which said information was taken.

If desired the parts of dividers or counters 65 and 66 or 165 and 166 may be designed in known manner so that, by operation of a changeover switch, they may be made either to count upwards from 1 to 4000 (as described in the foregoing description) or downwards from 4000 to 1. If, by operating the changeover switch the two pairs of dividers are caused to count downwards the result will be to present the pictures on the final display tube in the reverse order and an aircraft which was, for example, shown (in one position of the switch) on the final display tube as moving away from left to right will now appear (with the switch in the other position) to move in the opposite direction. The control of the changeover switch may be manual or, if desired, this switch may be automatically changed over after each twenty pictures on the display tube. This provision has the advantage of making visual discrimination by "pattern of movement" between desired targets and clutter easier for the observer.

I claim:
1. A radar system comprising means for repeatedly exploring a volume of space with transmitted radio energy successive explorations occurring at a normal predetermined repetition rate; means for producing from each exploration a set of radio echo signals representative of radio reflecting targets in said volume and encountered during that exploration; a signal store comprising in combination a cathode ray storage tube of the kind having a storage target and a matrix of storage elements; means for storing in said store a plurality of said sets of radio echo signals produced from a succession of explorations, said sets being stored in said store at the intervals at which they are produced and said store being arranged, when once filled, to accept further successive sets in successive replacement of the sets already in said store when filled whereby said store remains filled with the last produced plurality of sets; means for cyclically and continuously taking off from said store the signals stored therein at a rate such that the number of sets of signals taken off per unit of time is high in relation to the number of sets of signals placed in said store per unit of time; and means for displaying the signals taken off.

2. A system as claimed in claim 1 wherein the means for taking off signals from the store are adapted to take them off in the same order as that in which they were stored in said store.

3. A system as claimed in claim 1 wherein the means for taking off signals from the store are adapted to take them off in the opposite order from that in which they were stored in the store.

4. A system as claimed in claim 1 and comprising means operable at will for taking off signals from the store either in the same order as that in which they were stored in the store or in the opposite order.

5. A radar system comprising means for repeatedly exploring a volume of space with transmitted radio energy, successive explorations occurring at a normal predetermined repetition rate, means for producing from each exploration, a set of radio echo signals representative of radio reflecting targets in said volume and encountered during that exploration, a store comprising in combination a cathode ray storage tube of the kind having a storage target, and a matrix of storage elements; means for storing in said target successive sets of radio echo signals; means for picking off from said target each set of radio echo signals in the interval between the storing of one set and the storing of the next; means for feeding the picked off signals to said matrix and means for directing each successive picked off signal to a different address in said matrix; means for cyclically and continuously taking off from said matrix the signals stored therein, and a display cathode ray tube fed with the signals taken off from said matrix, the sets of produced echo signals thereby being displayed at a repetition rate, from set to set, which is high in relation to the repetition rate of exploration.

6. A system as claimed in claim 5, and further including means for eliminating from the produced sets of radio echo signals representative of radio reflecting targets those echo signals which do not differ substantially in frequency from the transmitted frequency.

7. A system as claimed in claim 5, and further including means for eliminating from the produced sets of radio echo signals representative of radio reflecting targets those echo signals which exceed a predetermined time duration.

8. A system as claimed in claim 5 wherein the signals of each set stored in the storage tube target are distributed thereover in accordance with a television line raster and the signals fed to the display tube are displayed thereby in a corresponding television line raster.

9. A system as claimed in claim 5 wherein the radio echo signals representative of radio reflecting targets are all included in the sets of radio echo signals which are produced.

10. A system as claimed in claim 5 wherein the aforesaid volume of space is a small part of the whole coverage volume of space of the radar system and means are provided for moving the aforesaid volume to different positions in said coverage volume.

11. A radio system as claimed in claim 5 and including an ordinary P.P.I. display tube arranged and adapted to display the whole coverage volume of the system and an additional display tube arranged to provide a television line raster display of the sets of signals as they occur.

References Cited by the Examiner

UNITED STATES PATENTS

| 2,585,868 | 2/52 | Spaulding | 343—11 |
| 2,716,203 | 8/55 | Sen et al. | 343—7.7 |
| 2,774,964 | 12/56 | Baker et al. | 343—6 |
| 3,063,040 | 11/62 | Drukey et al. | 343—17.1 |

CHESTER L. JUSTUS, *Primary Examiner.*